US012263360B2

(12) United States Patent
Welch et al.

(10) Patent No.: US 12,263,360 B2
(45) Date of Patent: Apr. 1, 2025

(54) PROTECTIVE HEADWEAR, GARMENT ASSEMBLY AND METHOD OF DONNING

(71) Applicant: US Army, Aberdeen Proving Ground, MD (US)

(72) Inventors: Lauretta Welch, Baltimore, MD (US); Stephanie Broce, Salem, VA (US); Lynn Anderson, Chelmsford, MA (US)

(73) Assignee: US Army, Aberdeen Proving Grounds, MD (US)

( * ) Notice: Subject to any disclaimer, the term of this patent is extended or adjusted under 35 U.S.C. 154(b) by 0 days.

(21) Appl. No.: 18/494,589

(22) Filed: Oct. 25, 2023

(65) Prior Publication Data

US 2024/0131371 A1 Apr. 25, 2024
US 2024/0226614 A9 Jul. 11, 2024

Related U.S. Application Data

(60) Provisional application No. 63/419,076, filed on Oct. 25, 2022.

(51) Int. Cl.
*A62B 17/04* (2006.01)
*A42B 1/041* (2021.01)
(Continued)

(52) U.S. Cl.
CPC ............ *A62B 17/006* (2013.01); *A42B 1/041* (2013.01); *A42B 1/046* (2013.01); *A62B 17/04* (2013.01); *A41D 2200/20* (2013.01)

(58) Field of Classification Search
CPC ..... A62B 17/04; A62B 17/006; A62B 17/001; A42B 1/046; A42B 1/041; A42B 1/048;
(Continued)

(56) References Cited

U.S. PATENT DOCUMENTS 2,446,530 A * 8/1948 De Grazia ............. A62B 17/04 2/205
2,448,021 A * 8/1948 De Grazia ............. A42B 1/046 2/205
(Continued)

FOREIGN PATENT DOCUMENTS

DE 202012003807 U1 * 12/2012 ............. A42B 1/048
KR 19980021301 U * 7/1998
(Continued)

OTHER PUBLICATIONS

English translation of KR 19980021301 U (Doc pub. Jul. 1998) (Year: 1998).*

*Primary Examiner* — Amy Vanatta
(74) *Attorney, Agent, or Firm* — Robert D. Jones

(57) ABSTRACT

The protective headwear and garment assembly/system facilitates the formation of a secure interface/connection/fit between the protective headwear system and (preferably) a gas mask that is intended to be worn with the garment assembly. The system includes a tensioner system that is configured to ensure a tight, secure fit between a (preferably) neoprene facial seal component of the protective headwear, and the gas mask. The system also includes a tightening element to securely fit the protective headwear to the neck and body of the user.

17 Claims, 7 Drawing Sheets

(51) Int. Cl.
*A42B 1/046* (2021.01)
*A62B 17/00* (2006.01)

(58) Field of Classification Search
CPC ......... A42B 1/018; A42B 1/04; A42B 1/0186; A41D 2200/20; A41D 13/1153
USPC ...................................................... 2/202, 205
See application file for complete search history.

(56) References Cited

U.S. PATENT DOCUMENTS

| | | | | | |
|---|---|---|---|---|---|
| 3,768,100 | A * | 10/1973 | Colman | A41D 13/1161 | 2/9 |
| 5,181,506 | A * | 1/1993 | Tardiff, Jr. | A62B 18/02 | 128/201.29 |
| H1361 | H * | 10/1994 | Tardiff, Jr. | B32B 27/12 | 2/205 |
| 5,653,225 | A * | 8/1997 | Schegerin | A62B 18/08 | 128/201.24 |
| 2005/0268907 | A1* | 12/2005 | McFarlane | A62B 18/00 | 128/201.24 |
| 2006/0117470 | A1* | 6/2006 | Hofmann | A62B 17/006 | 2/202 |
| 2017/0120083 | A1* | 5/2017 | Pratt | A62B 17/04 | |
| 2020/0281286 | A1* | 9/2020 | Cuoco | A42B 1/046 | |
| 2021/0307416 | A1* | 10/2021 | Lessey, Sr. | A41D 13/1161 | |
| 2022/0095731 | A1* | 3/2022 | Carey | A42B 1/205 | |
| 2022/0323798 | A1* | 10/2022 | Gerhart | A62B 17/04 | |

FOREIGN PATENT DOCUMENTS

| | | | | |
|---|---|---|---|---|
| KR | 200389387 | Y1 * | 7/2005 | |
| WO | WO-9419055 | A1 * | 9/1994 | A62B 17/04 |
| WO | WO-2008131812 | A1 * | 11/2008 | A41D 13/02 |

* cited by examiner

PROTECTIVE HEADWEAR, GARMENT ASSEMBLY AND METHOD OF DONNING

REFERENCE TO RELATED APPLICATIONS

This application claims priority to U.S. provisional patent application filed No. 63/149,076, which is hereby incorporated by reference.

GOVERNMENT INTEREST

The innovation described herein may be manufactured, used, imported, sold, and licensed by or for the Government of the United States of America.

BACKGROUND

Certain environmental, chemical, biological, and radiological agents can be destructive weapons used to terrorize, incapacitate, harm, or kill. Such agents can pose a real and growing threat to military personnel, as well as civilians. As a result, there is a growing need to protect both the military personnel and civilians, and other life (such as animals) from such agents.

Goggle and gas masks are used to protect against such agents. Gas masks in combination with other protective garments such as jackets, pants and hoods provide comprehensive protection for a user's entire body. Having discrete protective garments provides a user a way to conveniently don protective garments. The interfaces between the garments also provide opportunities to improve the protection provided.

Headwear including hoods typically use methods to tighten or secure the headwear around a user's head. One example of a method is tightening a cinch or drawstring. Tightening the headwear around a user's head can often create non-sealed surfaces. When a user wears a gas mask or goggles in combination with the headwear, non-sealed surfaces exist between the headwear and the gas mask. The need exists for a protective garment system that maintains an effective seal as the headwear is positioned and tightened around a user's head, face, and neck area.

SUMMARY

This disclosure is directed to a garment for the protection of a user from environmental hazards. The garment comprises a hood for covering at least the user's head, face, and neck. The hood has a top portion and at least one side portion that extends downwardly from the top portion of the hood. The hood further comprises a (preferably) neoprene facial seal component that is coupled to the hood. A tensioner embedded in/connected to the seal component is adapted to move at least one portion of the hood towards the user's head.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

Figure 1:
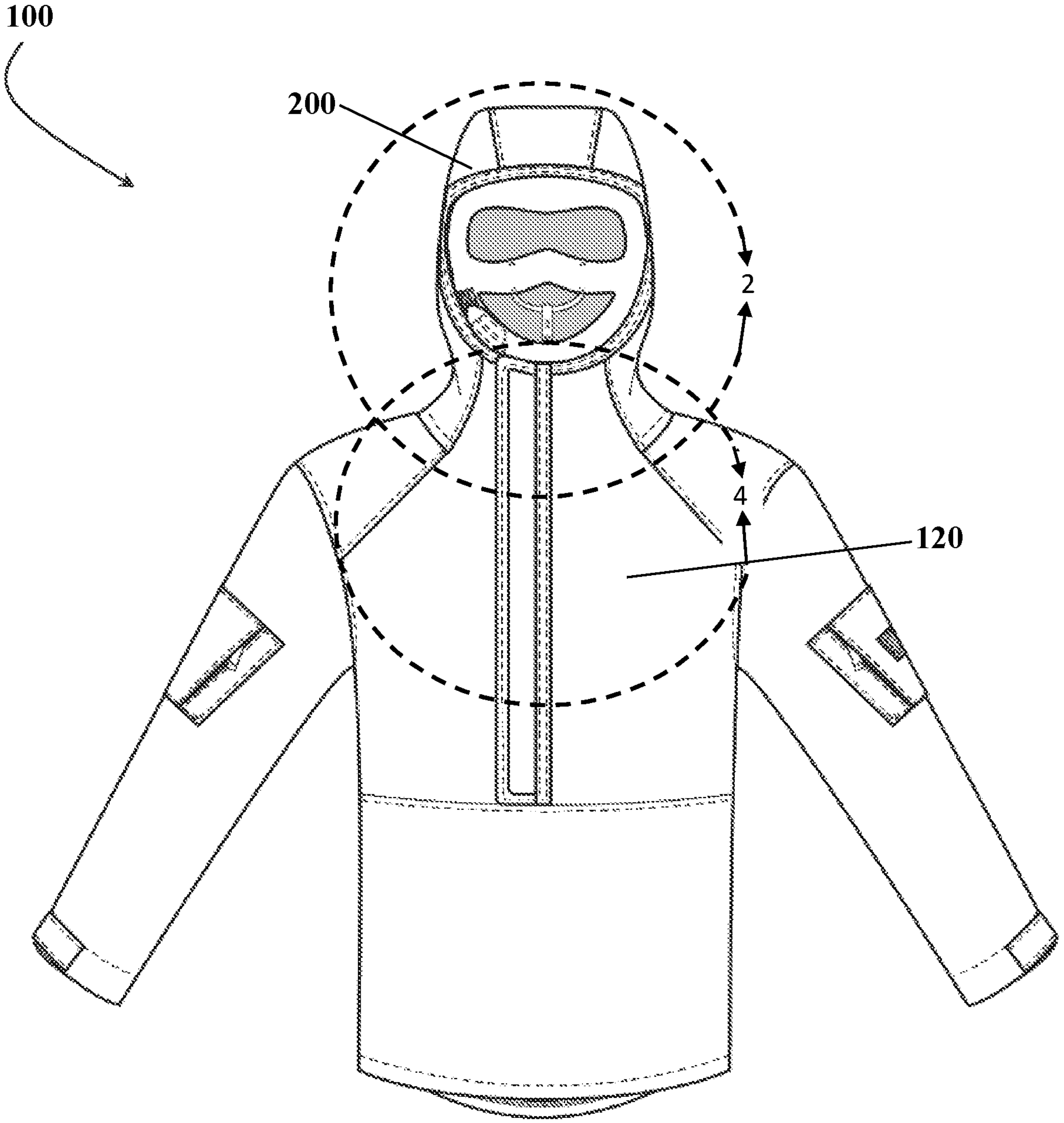
FIG. 1 is a front schematic view of an embodiment of the protective garment system described herein.

Note that assemblies/systems in some of the FIGs. may contain multiple examples of essentially the same component. For simplicity and clarity, only a small number of the example components may be identified with a reference number. Unless otherwise specified, other non-referenced components with essentially the same structure as the exemplary component should be considered to be identified by the same reference number as the exemplary component. Further, unless specifically indicated otherwise, drawing components may or may not be shown to scale.

DETAILED DESCRIPTION

Aspects of the disclosed embodiments are directed to protective garments including a protective hood, and an assembly of garments as well as methods for donning the garments for protection against chemical, biological, and radiological threats in liquid, vapor, and aerosol forms.

Referring to FIGS. 1-3 and 5-6, a garment system 100 for protection of a user from environmental, chemical, biological, and radiological hazards is shown. The garment system 100 includes headwear such as a hood 200 for covering a user's head, the hood 200 having a top portion 202 and at least one side portion 204 extending from the top portion. The hood 200 may further include a second side portion 206 that in one embodiment, lies opposed to the first side portion 204.

Figure 2:
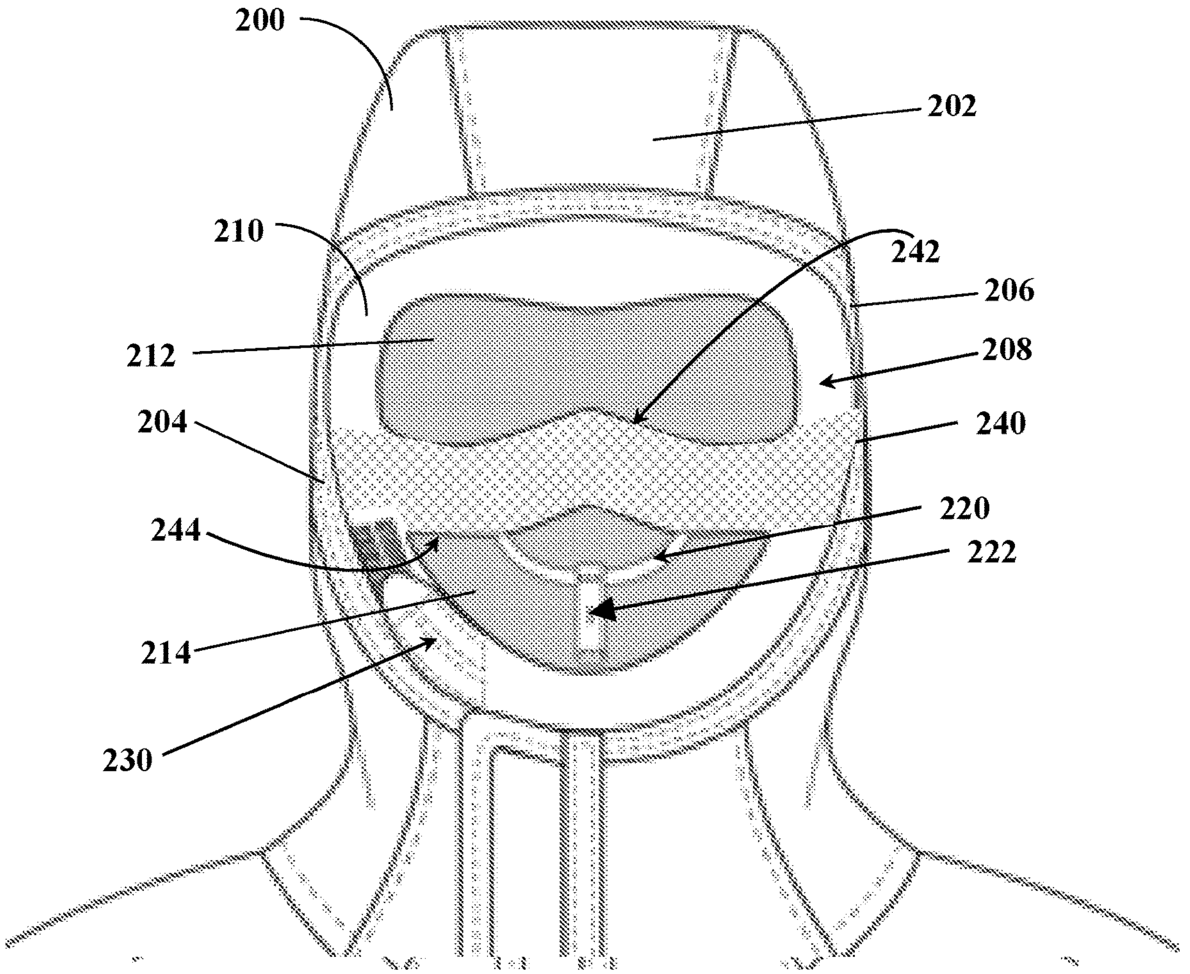
FIG. 2 is a front enlarged schematic view of the head portion of the protective garment system shown in FIG. 1.

Referring to FIG. 2, the hood 200 includes a seal/mask/facial protective component 210 coupled to the hood 200. The coupling/connection can occur in multiple ways including the use of adhesives. In another embodiment, the seal 210 is sewn to the hood so that threads are used to fasten the seal 210 to the hood 200, where a layer of the seal overlaps one or more layers of the hood. The seal 210 is coupled to the top portion 202 and at least one side portion 204, 206.

The seal 210 may also be coupled to both side portions 204, 206. The seal 210 may comprise multiple elements or be a single element. The seal 210 has at least a first aperture 212 where features of a gas mask, or ski mask such as goggles-type protective eye protection/goggle lenses or a separate set of goggles, and exhalation ports may be disposed. A second aperture 214 may be provided in the seal so that features may be disposed in different apertures. The seal 210 can be comprised of an elastic or stretchable material such as rubber or neoprene so that the seal achieves a secure connection (i.e. a snug fit) with the goggles-type eye protection and/or the exhalation/inhalation ports of the (preferably) gas mask 300.

Figure 4:
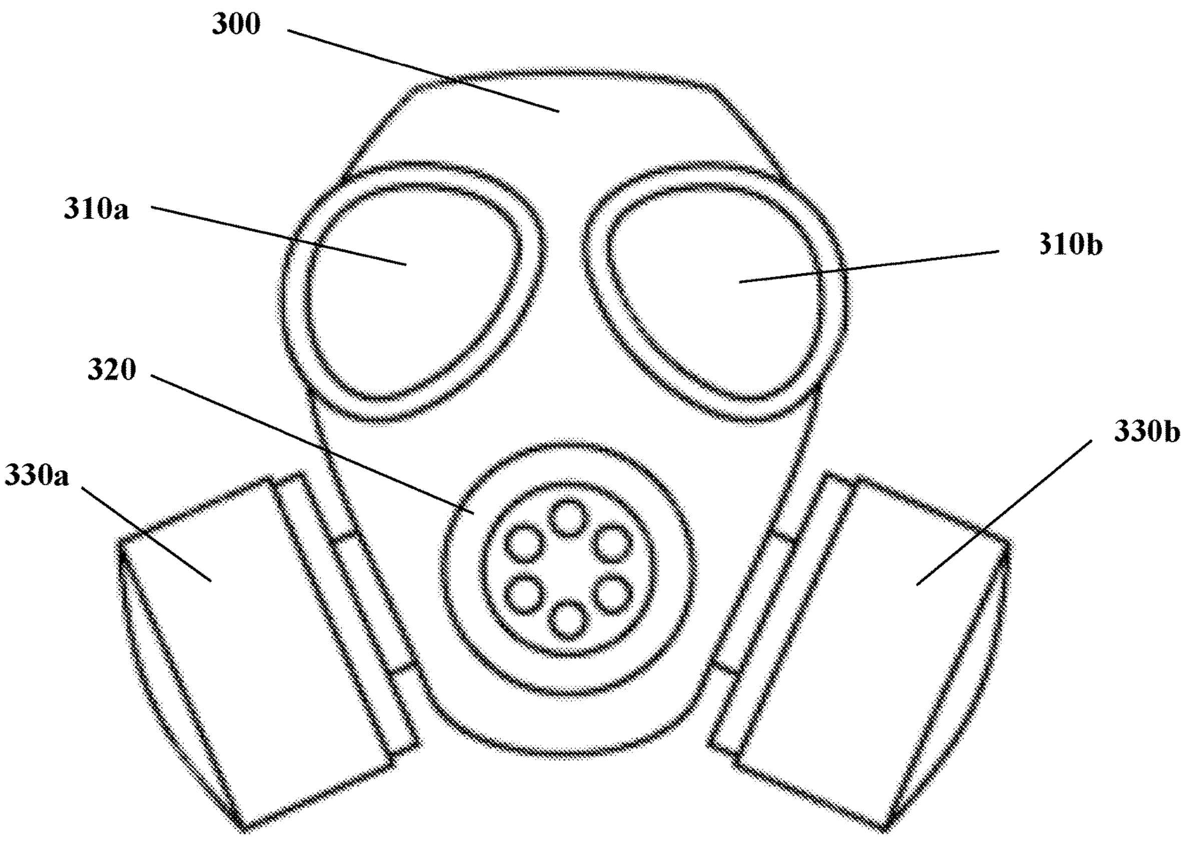
FIG. 4 a front schematic view of a gas mask of the type intended to be combined with the protective hood shown in FIGS. 1-3, and 5-6.
Figure 5:
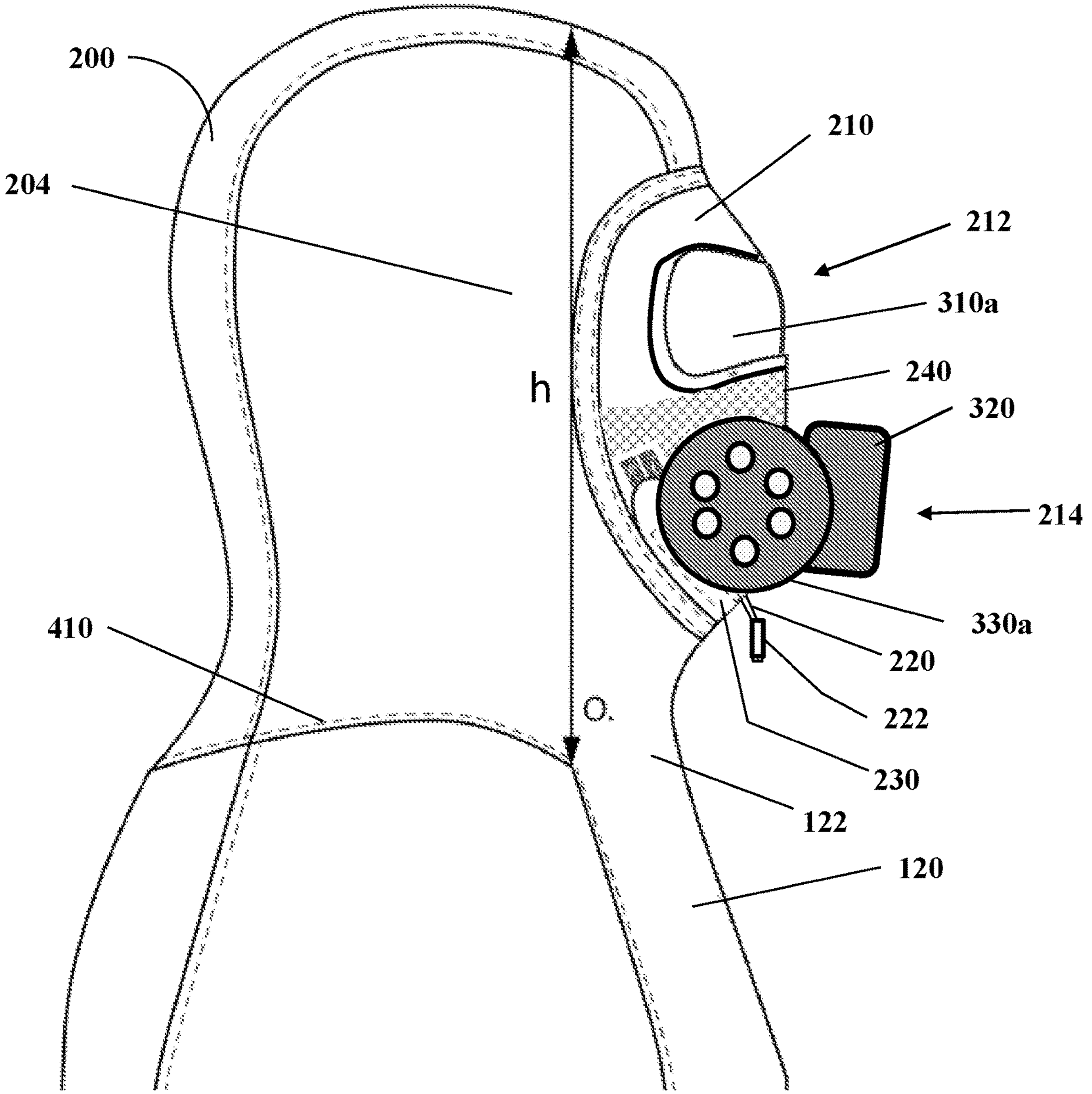
FIG. 5 is a schematic profile view of the protective garment shown in FIGS. 1-3 and 6 with the gas mask shown in FIG. 4.

For the purposes of this disclosure, the term "eye protection-type goggles" comprises goggles that at least partially cover the user's eyes. The goggles may comprise individual lenses (as shown in FIG. 4) or a single undivided lens that extends across the face of the user (as shown in FIG. 5), as well other variations that may comprise more than two of lenses, or unconventionally structured lenses.

As further shown in FIG. 2-5, in an embodiment, a first aperture 212 has a majority of its footprint in one half of the seal 210 and a second aperture 214 has a majority of its footprint in a second half of the seal 210. In an embodiment, the first or upper aperture 212 is adapted to have goggles-type eye protection disposed within, and the second or lower aperture 214 is adapted to have a (for example) gas mask exhalation port 320 disposed within. In an embodiment, the second aperture 214 has a portion of its shape that is complimentary in curvature to an exhalation port 320 when the exhalation port 320 is disposed within—which essentially means that the second aperture 214 in the seal 210 is shaped/formed so that the seal 210 forms a secure connection (i.e. a snug fit) with the exhalation port 320. The exhalation port 320 may be part of mask 300 that includes goggles-type eye protection 310*a*, 310*b*, or the exhalation port 320 may be separate. For example, the exhalation port 320 may be part of a standalone respirator that is worn with a separate pair of goggles.

Referring again to FIGS. 2-3 and 5, the hood 200 includes a tensioner 240 adapted to move at least one portion of the hood 200 towards the user's head. In the prior art, the hood 200 does not have, or lacks a sufficient mechanism to move the top portions or side portions such that they provide a desired seal about a user's head. In an embodiment, a tensioner 240 that is coupled or attached to the top or at least one of the side portions 204, 206 of the hood 200 and is used to move a portion of the hood 200 towards the user's head to improve the sealing effect of the hood 200.

As shown in FIG. 2, the tensioner 240 can take the form of a flat elastic strap component that extends between the two opposed side portions 204, 206, thus pulling each of the side portions towards the user's head. The tensioner 240 can be a separate element from the seal 210 whereby the seal acts as an intermediate element to pull a hood portion towards the user's head. The tensioner 240 may also be integral to the seal 210 and comprise a similar or identical material. The tensioner 240 may also be coupled directly or indirectly to portions of the hood 200, for example, the tensioner 240 may be directly connected to the seal 210 and through the seal 210, creates a force on the seal, causing the hood 200 to move towards the user's head.

Figure 3:
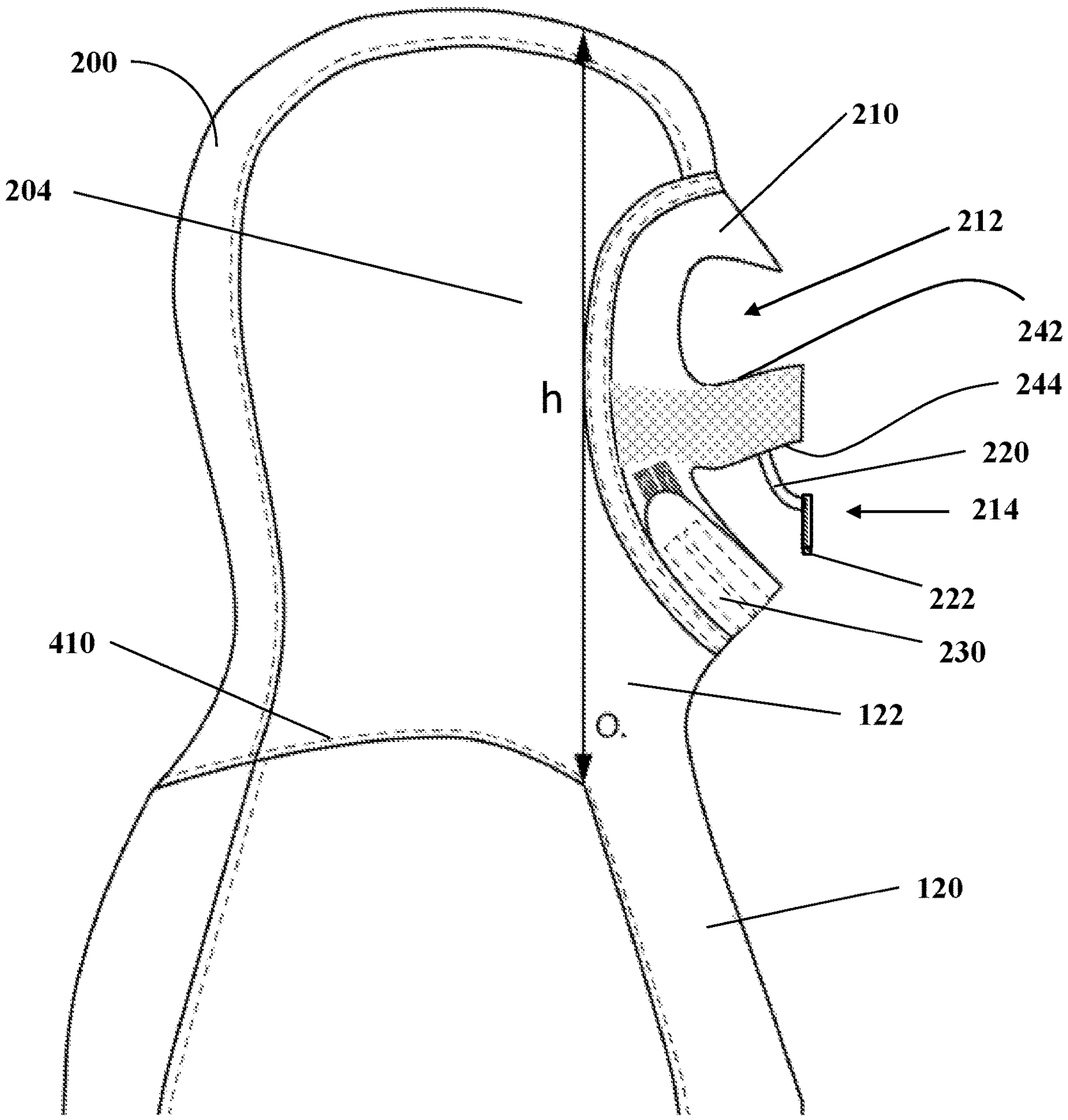
FIG. 3 is a schematic profile view of the protective garment shown in FIGS. 1-3 and 5-6.

As best shown in FIGS. 2-3 and 5, in an embodiment, the tensioner 240 can form part of the shape of the first 212 and second 214 apertures. In this embodiment, the tensioner 240 can be integral with the seal 210 or fastened to the seal 210 or hood 200. The top edge 242 of the tensioner 240 is at least partially defined by the first or top aperture 212 and the bottom edge 244 of the tensioner 240 is at least partially defined by the second or lower aperture 214 in the seal 210.

As best shown in FIG. 2, a securing cord 220 may be coupled to the tensioner 240 in one or more locations. The securing cord 220 may include a tab 222 to aid in pulling on the securing cord 220. In an embodiment, the securing cord 220 is coupled to the tensioner 240 and is adapted to move the tensioner 240 to a desired position when the securing cord 220 is moved. In an example, when an exhalation port 320 is disposed within aperture 214 (per FIG. 5), the securing cord 220 is extended around the exhalation port 320, causing the tensioner 240 to be secured in place. The securing cord 220 may also be secured at other locations including an air intakes 330*a*, 330*b* (FIG. 4-5) of a gas mask 300, under a user's chin, or a tie down (not shown) located on the hood 200, seal 210 or body 120. In the preferred embodiment, the securing cord 220 may comprise a flat elastic cord and the tab 222 comprises a webbing-type material.

In an embodiment, the seal 210 further comprises a tightening element 230. The tightening element 230 preferably comprises a strap that lies on the outer surface 208 of the seal 210. The tightening element 230 may be integral to the seal 210 or may be fastened to the seal 210 on an end in a generally permanent, secured manner. The opposed end of the tightening element 230 is removably secured at an opposed end. The tightening element 230 performs the function of tightening a portion of the seal 210 by securing the removably secure end in a manner that causes a portion of the seal 210 to compress, fold or overlap to reduce the footprint of the seal 210 such that the seal 210 is tighter about a user's head. In an embodiment, a hook-and-loop fastener (such as Velcro™) is used to removably secure the tightening element 230. In an embodiment, tightening element 230 is located below second aperture 214, the second aperture 214 being primarily located in a lower half of the seal 210.

Example alternatives include a tensioner 240 extending from side portion 204 of the hood 200 to air intake 330*b* of the mask 300, a tensioner 240 extending from side portion of the hood 206 to exhalation port 320 and a tensioner 240 extending from side portion 202 to goggle lens 310*b*. In this embodiment, the tensioners/tensioner segments 240 may be directly or indirectly connected.

Similar to the embodiment shown in FIG. 2, the tensioner 240 may directly connect to the seal 210 or may be integral to the seal 210. The tensioner 240 may also use an intermediate element to connect to a hood portion 200 or to the body 120 or gas mask 300. The gas mask 300 may be a single element or multiple elements. The garment system 100 may also be used with other types of masks where sealing is required, for example, a medical mask, ski mask or utility goggles.

FIG. 4 shows an exemplary embodiment of a type of gas mask 300 that may be worn in combination with the garment as shown in FIGS. 1-3 and 5-6. The mask 300 has at least one goggle 310*a* and/or a second goggle 310*b*, an exhalation port 320 and one or more air intakes 330*a*, 330*b*.

FIG. 5 shows the hood 200 and body 120 of the garment 100 in place on a user. Referring also to FIGS. 5, the seal 210 has at least a first or upper aperture 212 with one or more goggle lenses 310*a*, 310*b* disposed therein. The seal 210 may also have a second or lower aperture 214 where one or more of the exhalation ports 320 and/or one or more air intakes 330*a*, 330*b* and is disposed within. The tensioner 240 extends between the two opposed side portions 204, 206 (see FIG. 2). In an embodiment, the tensioner 240 may also be disposed between the goggle lenses 310*a*, 310*b* and the exhalation port 320.

The assembly 100 may further comprise a body 120 portion of the garment system (FIG. 1) and is coupled to the hood 200 for covering the chest and back of a user. The assembly 100 can further include a securing cord 220 (per FIGS. 2-3 and 5) that is coupled to and extends from the tensioner 240 to below an exhalation valve 320 of a user-worn mask or gas mask 300. The seal 210 can further comprise a tightening element 230 below a second or lower aperture 214 of the seal.

In an embodiment, the tensioner 240 has multiple segments that secure to more than two points, the points including the top portion 202 or one of the side portions 204, 206 of the hood 200, a portion of the body 120, a portion of the seal 210, or to an element of a user-worn gas mask 300 including goggle lenses 310*a*, 310*b*, air intakes 330*a*, 330*b*, or exhalation port 320. In a first example/alternative embodiment, the tensioner 240 extends from the top portion 202 of the hood to under the goggle lenses 310$a$, 310$b$ and then to each of the side portions 204, 206 of the hood 200. In a second example, there are two tensioners 240—the first tensioner extends from side portion 204 to intake 330$b$ and the second tensioner which extends from side portion 206 to intake 330$a$. In this embodiment, the tensioners cross or overlap each other. The tensioner 240 may also extend from one side portion (for example 204) to a corresponding opposite side portion (for example 206) and may (or may not) be coupled with seal 210.

With regard to FIGS. 3 and 5, the height h of the hood 200 is of sufficient height to cover a user's head. In an embodiment, the hood 200 is also of sufficient height to cover a majority portion of a user's neck. In an embodiment, the garment system 100 is constructed by fastening multiple sections together, such as fastening the hood 200 to the body 120. The hood 200 and body 120 are generally coupled at their respective ends 410 where adhesive, stitching or other suitable means is used. In an embodiment, the side portions 204, 206 of the hood couple at their ends 410 to the body 120 and a front portion of the body has a tongue 122 that couples to the seal 210 as well as the side portions 204 and 206. A portion of the tongue 122 may overlap material from the hood 200 to accomplish the coupling.

Figure 6:
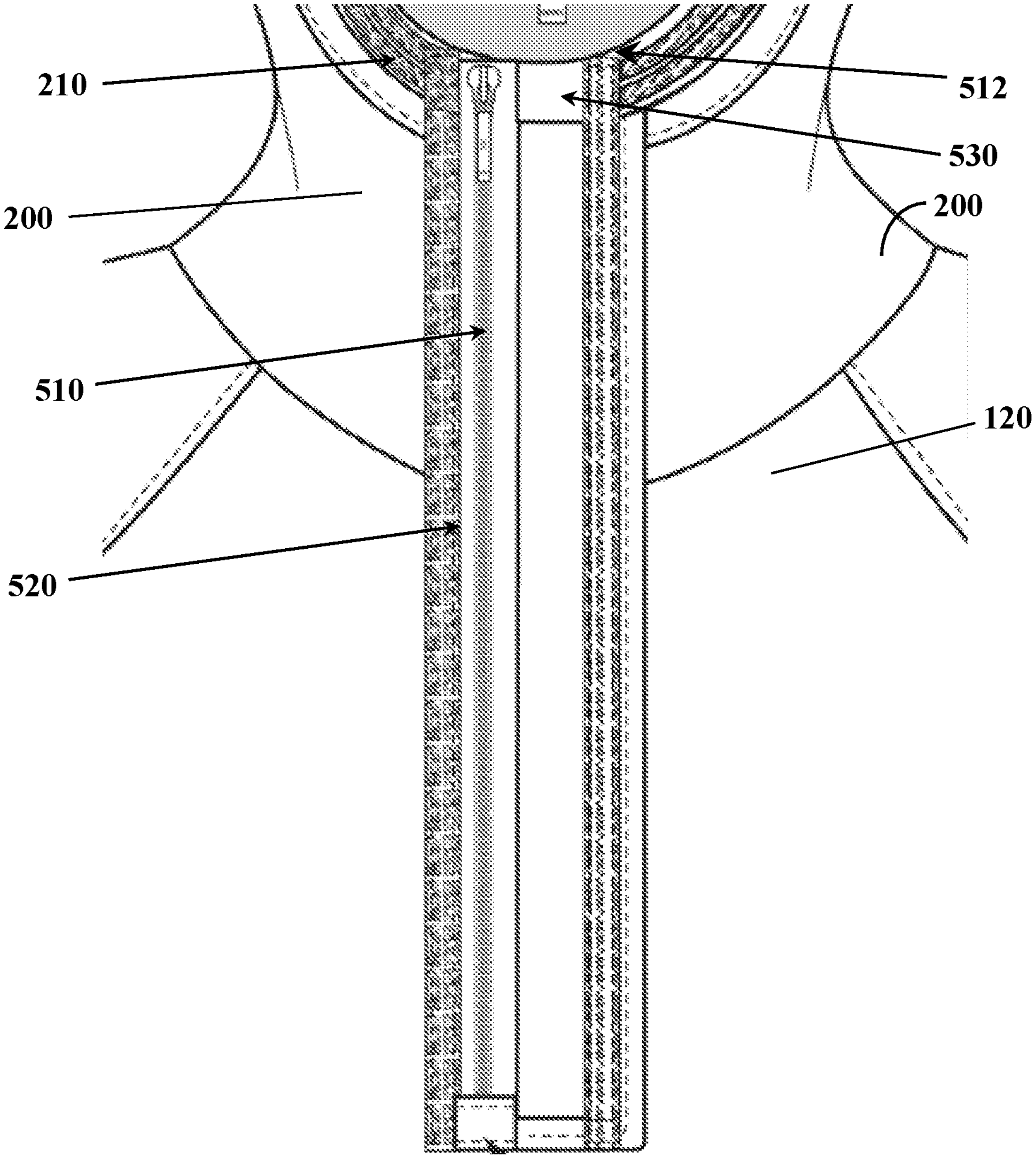
FIG. 6 is a front schematic view of the lower portion of the garment system shown in FIGS. 1-3, and 5-6.

Referring to FIG. 6, the body 120 and the seal 210 each have an open position and a closed position. An opening tab 530 of the seal 210 is located at a lower end 512 of the seal 210. When the tab 530 opens the seal 210, the opening provides an aperture for a user to place their head within the hood 200. The opening tab 530 may be coincident with the second, lower aperture 214 of the seal 210 to provide a combined aperture when the seal opening tab 530 is present. In an embodiment, an opening tab 520 may also be located in the body 120 where the opening in the seal 210 extends to the opening 520 in the body 120, thus creating a common opening such that a larger aperture is created than either of the seal opening tab 530 or body opening tab 520 alone can create. A common fastener 510 may be used to open and close the seal opening tab 530 and body opening tab 520. Common fasteners 510 that may be used include Velcro™, zippers and buttons with zippers providing improved sealing over buttons. The opening tabs 520, 530 may be implemented in combination with a user worn mask (such as 300) to create an assembly having seal 210 and body 120 that have an open and closed position.

Figure 7:
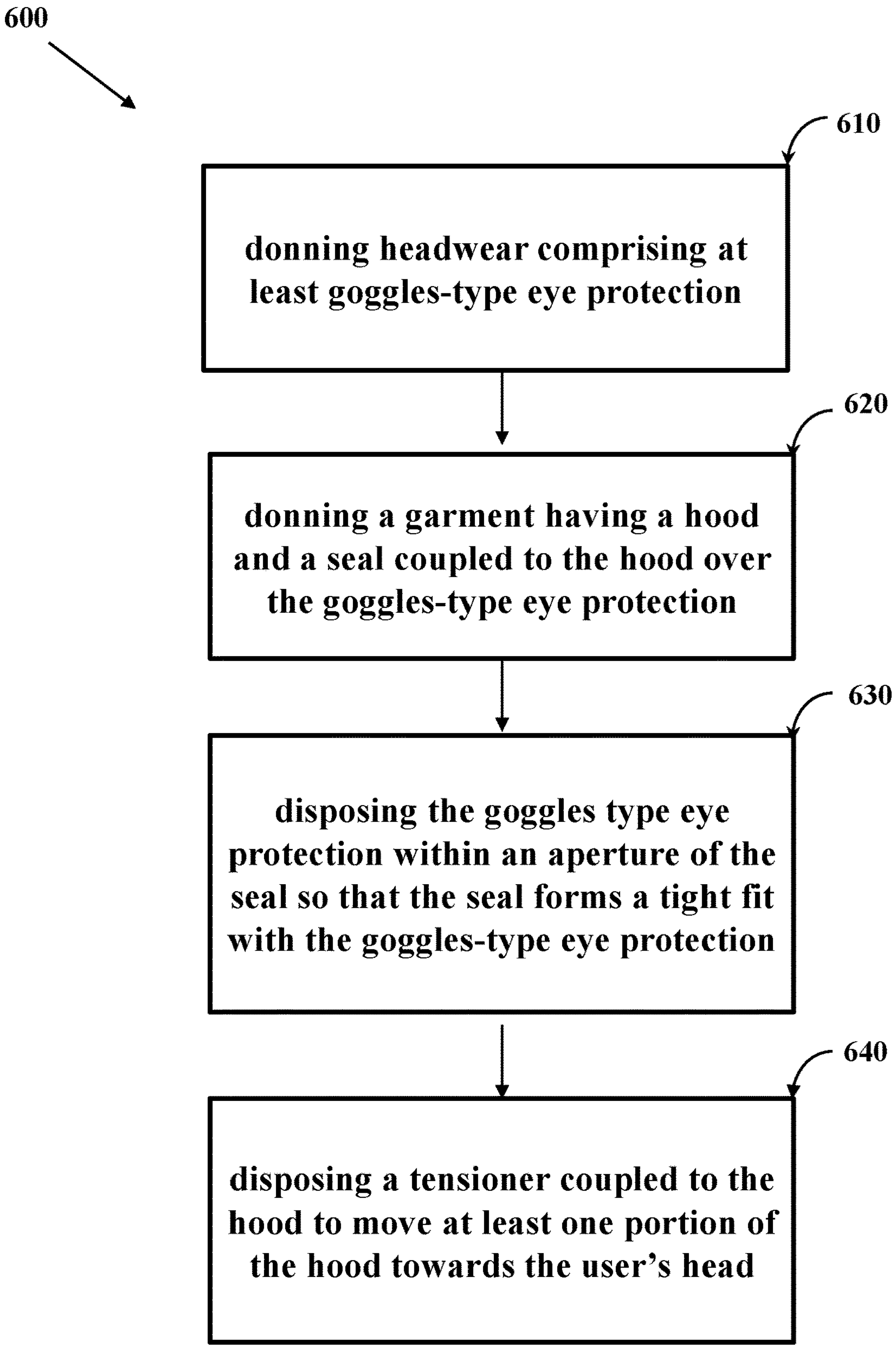
FIG. 7 is a flow chart 600 describing a method of donning the protective equipment.

Referring to FIG. 7, a method 600 of donning environmentally protective equipment is shown. The method comprises the step 610 of donning headwear comprising at least eye protection-type goggles 310$a$, 310$b$—including (but not limited to) the goggles 310$a$, 310$b$ best shown in FIGS. 4-5; followed by the step 620 of donning a garment 100 having a hood 200 and a seal 210 coupled to the hood 200, over the goggles 310$a$, 310$b$; further followed by the step 630 of disposing the goggles 310$a$, 310$b$ within an aperture 212 of the seal 210; and finally, disposing a tensioner 240 coupled to the hood 200 to move at least one portion of the hood 200 towards the user's head.

The method may further comprise donning an exhalation port 320 and disposing the exhalation port 320 within the seal 210. The method may also comprise extending a securing cord 220 from the tensioner 240 to below an exhalation port 320. The embodiments of the methods described in reference to FIG. 7 can incorporate the structural limitations of the embodiments as described above and the further material and layer descriptions below.

For example, the methods can incorporate a seal 210 having an opening and a body 120 having an opening. In another example, the tensioner 240 is a cord or a strap, where at least one end of the tensioner 240 is coupled to one of the top portion 202 or one of the side portions 204, 206 of the hood and may (or may not) be coupled with the seal 210. The opposed end of the tensioner is secured to any of another portion of the hood, a portion of the body 120 a portion of the seal 210, or to an element of a user-worn gas mask 300 including goggle lenses 310$a$, 310$b$, air intakes 330$a$, 330$b$, or exhalation port 320. The coupling can be direct or indirect, for example, the tensioner is directly coupled to the seal by fastening or is integral, that is, the same material as the seal and an extension of it.

The headwear 200, seal 210, and body 120 may be constructed using a number of materials to create one or more layers of resistance. In one embodiment cold or fire resistant or non-fire-resistant materials, stretch or non-stretch fabrics, knit or woven fabric materials that can be, for example, aramid-based flame-resistant material, cotton, nylon, blends such as cotton blends and nylon/cotton blends, polyester or polyester blends. In another embodiment, an aerosol resistant layer, that is substantially impervious to penetration by aerosol particles (such as dust and aerosolized chemical agents, for example, dusty mustard, or biological agents), can comprise material such as expanded polytetrafluoroethylene (ePTFE), preferably microporous ePTFE, nanofibers such as polyurethane, polysulfone, nylon-6, polyvinylidene difluoride, polyether sulfone, or other polymer and microfibers such as polypropylene microfibers or microfibers of another polymer. A repellant coating or finish, such as, for example, a liquid repellant coating (such as silica based liquid repellent coatings or perfluorinated carbon based liquid repellent coatings) may be applied to a surface of one or more of the garments.

The headwear 200 and body 120 can be constructed from multiple layers including a shell, a liner and a membrane. Shell fabrics may comprise synthetic or natural fiber including nylons, cotton, polyesters, modacrylic, aramids, and blends containing any of these. One commonly used blend is a blend of nylon and cotton fibers ("NYCO"). Preferred polyesters are PET (co)polymers and blends and PPT (co) polymers and blends. A suitable aramid may be in the form of a copolymer that may have as much as 10 percent of other diamine(s) substituted for the diamine of the aramid or as much as 10 percent of other diacid chloride(s) substituted for the diacid chloride of the aramid. A p-aramid would be preferred in a fabric as used in this invention, and poly(p-phenylene terephthalamide) (PPD-T) is the preferred p-aramid. M-aramids may also find use in the present invention, and poly (m-phenylene isophthalamide) (MPD-I) is the preferred m-aramid. P-aramid and m-aramid fibers and yarns particularly suitable for use in the present invention are those sold respectively under the trademarks Kevlar® and Nomex® (E. I. du Pont de Nemours and Company, Wilmington Del., USA), and Teijinconex®, Twaron® and Technora® (Teijin Ltd., Osaka, Japan), and equivalent products offered by others.

The separable liner may comprise an adsorbent material, that is, a material capable of adsorbing species against which protection is desired. Adsorbent materials may be inorganic, such as one or more of silica gel, alumina or other metal oxides, metal hydroxides, molecular sieves, and zeolites; or they may be organic, such as activated carbon.

Chemically Protective Membrane

The chemically protective membrane may be any of a variety known in the manufacture of chemically protective garments, shelters, and coverings and is selected based on the nature of protection required. Additionally, the chemically protective membrane can extend the useful life of the adsorptive liner by protecting it from many external adsorbates.

The membrane can be a chemically protective membrane that is a barrier to liquid. The membrane may comprise any of a variety of polymers, including without limitation polyurethanes; polytetrafluoroethylene, polypropylene, polyether block polyamide copolymers ("PEBA"), polyether block polyester copolymers ("PEBE"); cellulose-based polymers; vinyl alcohol(co)polymers; perfluorinated sulfonic acid tetrafluoroethylene copolymers (such as Nafion® perfluorosulfonic acid tetrafluoroethylene copolymer, butyl rubber, tetrafluoroethylene (co)polymers, fluoroelastomers, polychloroprene, vinylidene chloride(co)polymers, PET film, metallized polymer film, vinyl chloride (co)polymers, acrylic(co)polymers, acrylonitrile(co) polymers, and ethylene vinyl alcohol copolymers.

A stretch protective composite fabric may include a fabric cover layer that stretches (for example a knit fabric material) and, thereby, provides a protective composite fabric that can stretch. Example of a stretch fabrics and stretch composite fabric include rubber, Buna-N/Nitrile/NBR, ethylene propylene diene monomer (EPDM), silicone, Fluoroelastomer/Viton, and polychloroprene.

While the methods disclosed herein are shown and described as a series of blocks, it is to be appreciated by one of ordinary skill in the art that the methods are not restricted by the order of the blocks, as some blocks can take place in different orders. In one example, for the method 600 of FIG. 7, the step of and disposing the exhalation port within the seal can occur before or after the step of disposing the goggle within an aperture of the seal 630.

For the foregoing reasons, it is clear that the subject matter described herein provides an innovative protective headwear garment system that may be used in multiple types of applications—including cold weather-type functions such as skiing. The current system may be modified in multiple ways and applied to various technological products/functions. The disclosed method and apparatus may be modified and customized as required by a specific operation or application, and the individual components may be modified and defined, as required, to achieve the desired result.

Although the materials of construction are generally described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed in this specification are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the implied term "about." The (stated or implied) term "about" indicates that a numerically quantifiable measurement is assumed to vary by as much as 30 percent, but preferably by at least 10%. Essentially, as used herein, the term "about" refers to a quantity, level, value, or amount that varies by as much 10% to a reference quantity, level, value, or amount. Accordingly, unless otherwise indicated, the numerical properties set forth in the following specification and claims are approximations that may vary depending on the desired properties sought to be obtained in embodiments of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein. The term "an effective amount" as applied to a component or a function excludes trace amounts of the component, or the presence of a component or a function in a form or a way that one of ordinary skill would consider not to have a material effect on an associated product or process.

What is claimed is:

1. A garment for protection of a user from environmental hazards, comprising:

- a hood for covering a user's head, the hood having a top portion and at least one side portion extending from the top portion;
- a seal coupled to the hood wherein the seal has at least a first aperture a majority of which is in a first half of the seal, and a second aperture a majority of which is in a second half of the seal;
- a tensioner adapted to move at least one portion of the hood towards the user's head, the tensioner configured to extend across the user's nose between the first aperture and the second aperture, the tensioner further comprising at least one securing cord coupled to the tensioner and adapted to move the tensioner to a desired position.

2. The garment of claim 1 wherein the seal is coupled to the top portion and to the at least one side portion.

3. The garment of claim 1, wherein the securing cord is adapted to extend from the tensioner to below an exhalation port of a user-worn gas mask.

4. The garment of claim 1 wherein the seal further comprises a tightening element below the second aperture.

5. The garment of claim 1, further comprising a body coupled to an end of the hood, the body for covering the chest and back of the user, wherein the body and the seal each have an open position and a closed position.

6. The garment of claim 1, further comprising a body coupled to an end of the hood, the body for covering the chest and back of the user, wherein an opening in the seal extends to an opening in the body.

7. The garment of claim 1, further comprising two opposed side portions that extend from the top portion of the hood, wherein the tensioner extends between the two opposed side portions, the tensioner having a top edge at least partially defined by the first aperture in the seal and having a bottom edge at least partially defined by the second aperture in the seal.

8. An assembly for protecting a user from environmental hazards comprising:

a mask having at least one goggles-type eye protection and an exhalation port;

a hood covering a user's head, the hood having a top portion and two opposed side portions extending from the top portion;

a seal, coupled to the top portion and each of the two side portions, the seal having at least:

(a) a first aperture with the goggles-type eye protection disposed therein;

(b) a second aperture below the first aperture; and, (c) a tensioner extending between the two opposed side portions and configured to extend across a user's nose between the first aperture and the second aperture, the tensioner comprising at least one securing cord coupled to the tensioner and adapted to move the tensioner to a desired position;

wherein as the user dons the hood, the seal achieves a secure connection between the seal and the at least one goggles-type eye protection.

9. The assembly of claim 8 further comprising a body coupled to the hood for covering the chest and back of the user.

10. The assembly of claim 8, wherein the securing cord is adapted to extend from the tensioner to below an exhalation port of a user-worn gas mask.

11. The assembly of claim 8 wherein the seal further comprises a tightening element below the second aperture of the seal.

12. The assembly of claim 9, wherein the body and the seal each have an open position and a closed position.

13. The assembly of claim 9, wherein an opening in the seal extends to an opening in the body.

14. The assembly of claim 8, wherein the second aperture has a portion that is complimentary in curvature to a portion of the exhalation port when the exhalation port is disposed within the second aperture.

15. A method of donning environmentally protective equipment comprising:

donning a mask having goggles-type eye protection and an exhalation port;

donning a garment having a hood and a seal coupled to said hood, over said mask;

disposing the goggles-type eye protection within a first aperture of the seal;

disposing the exhalation port within a second aperture of the seal; and disposing a tensioner coupled to said hood over said mask, the tensioner extending across a user's nose between the first aperture and the second aperture, the tensioner further comprising at least one securing cord coupled to the tensioner and adapted to move the tensioner to a desired position.

16. The method of claim 15 further comprising extending the securing cord from the tensioner to below the exhalation port.

17. The method of claim 15 further comprising fastening a tightening element to either the seal or the hood.

* * * * *